United States Patent [19]

Schroder

[11] 4,187,776

[45] Feb. 12, 1980

[54] BELT PRESS

[75] Inventor: Rolf Schröder, Wuppertal, Fed. Rep. of Germany

[73] Assignee: Wagener & Co., Schwelm, Fed. Rep. of Germany

[21] Appl. No.: 927,974

[22] Filed: Jul. 26, 1978

[30] Foreign Application Priority Data

Jul. 28, 1977 [DE] Fed. Rep. of Germany ....... 2734025

[51] Int. Cl.$^2$ .......................... B30B 5/02; B30B 15/34
[52] U.S. Cl. .................................... 100/93 P; 100/211
[58] Field of Search .................. 100/92, 93 P, 211; 156/580, 583; 425/501, 389, 446, 11

[56] References Cited

U.S. PATENT DOCUMENTS

| 1,806,861 | 5/1931 | Owen | 100/211 |
| 2,148,704 | 2/1939 | Merritt | 100/92 X |
| 3,500,566 | 3/1970 | Holyoake | 100/211 X |

FOREIGN PATENT DOCUMENTS

| 2307750 | 8/1973 | Fed. Rep. of Germany. | |
| 2248810 | 4/1974 | Fed. Rep. of Germany | 100/93 P |
| 1060296 | 11/1953 | France | 100/211 |
| 1382181 | 1/1975 | United Kingdom. | |

Primary Examiner—Peter Feldman
Attorney, Agent, or Firm—Karl F. Ross

[57] ABSTRACT

A belt press has vertically spaced upper and lower traverses carrying respective upper and lower platens each constituted by a traverse plate secured to the respective traverse, a press plate parallel thereto, and a flexible membrane connecting the outer peripheries of the press and the traverse plates. A skirt extends from each of the traverse plates around the respective press plate to guide and confine same during pressurization of the chamber defined in each platen by the respective press and traverse plates with the respective membrane.

7 Claims, 4 Drawing Figures

BELT PRESS

FIELD OF THE INVENTION

The present invention relates to a press. More particularly this invention concerns a belt press used for repairing or manufacturing endless conveyor or transport belts.

BACKGROUND OF THE INVENTION

A belt press normally comprises vertically spaced upper and lower traverses, each normally formed by a plurality of parallel profiled beams extending perpendicular to the direction of the belt passing through the press, and respective upper and lower platens carried by these upper and lower traverses. Each platen in turn is formed by a press plate that directly engages the belt being pressed and by an actuating member that urges the press plate away from the respective traverse to force it against the belt being pressed. Links are provided rigidly interconnecting the outer ends of the upper and lower traverses, which normally deform away from each other during the pressing operation.

The actuating member for such a system is normally fluid operated and comprises a simple bladder or cushion that is braced between the traverse and the respective press plate of each platen. Since the traverses do not present continuous support surfaces, it is standard practice to laminate to this cushion at least one plate that engages the respective traverses. Such a bladder or cushion, which replaces the hitherto used piston-and-cylinder arrangements, is then pressurized pneumatically or hydraulically for operation of the press.

Although the use of such a cushion or bladder does give considerable advantages over the standard piston-and-cylinder systems, the assembly is still relatively expensive. The laminating of reinforcing plates to the bladder considerably increases the cost of the system. Furthermore, as heaters are provided on the press plates, it is necessary to make the bladder of expensive heat-resistant material, or carefully to insulate the bladder.

OBJECTS OF THE INVENTION

It is, therefore, an object of the present invention to provide an improved belt press.

Another object is the provision of such a press which can be built at a lower cost than the above-described type of press.

SUMMARY OF THE INVENTION

The above objects are attained according to the instant invention in a belt press of the above-described general type, but where in the upper and lower traverses carry respective upper and lower imperforate traverse plates having respective lower and upper surfaces in turn having outer peripheries. The upper and lower press plates that are adjacent and generally parallel to these traverse plates have respective lower and upper imperforate surfaces also having outer peripheries. The outer peripheries of the press plates are provided with respective rigid upper and lower rims and upper and lower annular membranes are each connected between the respective rim and the respective traverse plate at the outer periphery thereof. Each of the membranes, therefore, forms with the respective upper and lower surfaces a pressurizable chamber which can be pressurized to compress a belt between the press plates with concomitant deformation of the traverses and of the traverse plates.

Thus in accordance with the instant invention the actuating means is integrated with the press plates in an extremely efficient manner that allows production costs for such a press to be reduced to a minimum. The press and the traverse plates of each of the platens therefore serve not only their normal functions, but the functions of bounding the pressurizable chamber whose flexible part is constituted by the annular membrane. A considerable advantage of this system is that it is possible to provide the heaters for the press plates inside the chambers of the platens, so that the normally technically difficult problem of providing these heaters either imbedded in the plate or otherwise protected from the bladder is completely obviated. What is more, cooling of the press is rendered relatively easy by this provision of the heaters inside the chambers, as evacuation of the fluid, normally air, used to pressurize the chambers, will inherently extract much of the heat from the platens, which can either be reused or exhausted.

According to another feature of this invention, one of the plates of each of the platens is formed with a vertically extending skirt that engages around and confines the membrane in the depressurized condition thereof, and which also acts as a vertical guide for the other plate. This represents yet another simplification of the system according to the instant invention, as this relatively easily manufactured skirt can act as an extremely stable guide.

According to this invention, the membranes support the press plates relative to the traverse plates, but nonetheless do not communicate the normal bowing of the traverse plates to the press plate. During such bowing the outer edges of the traverse plates normally move slightly inwardly, which motion should not be transmitted to the press plates. The use of a flexible membrane made either accordion-fashion of metal or of a simple sheet of an elastomer completely eliminates the possibility that bowing of the traverse plate would similarly bow the press plate.

SPECIFIC DESCRIPTION

Figure 1:
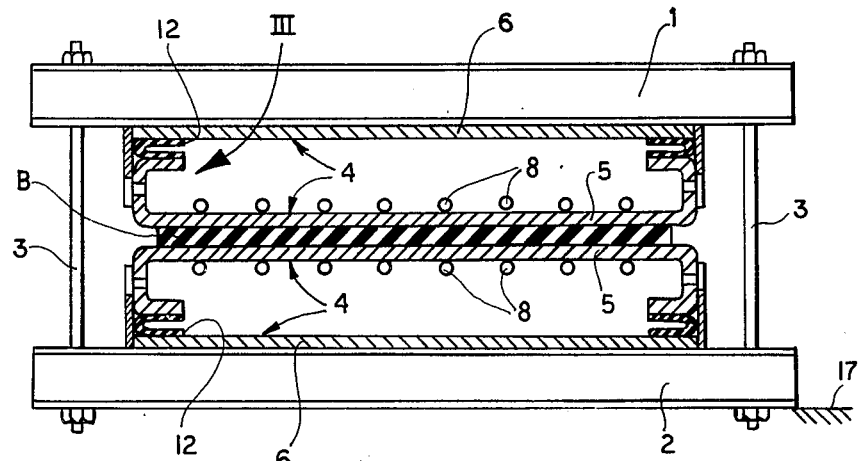
FIGS. 1 and 2 are cross sections through the press according to this invention, in the unpressurized and pressurized conditions, respectively.
Figure 2:
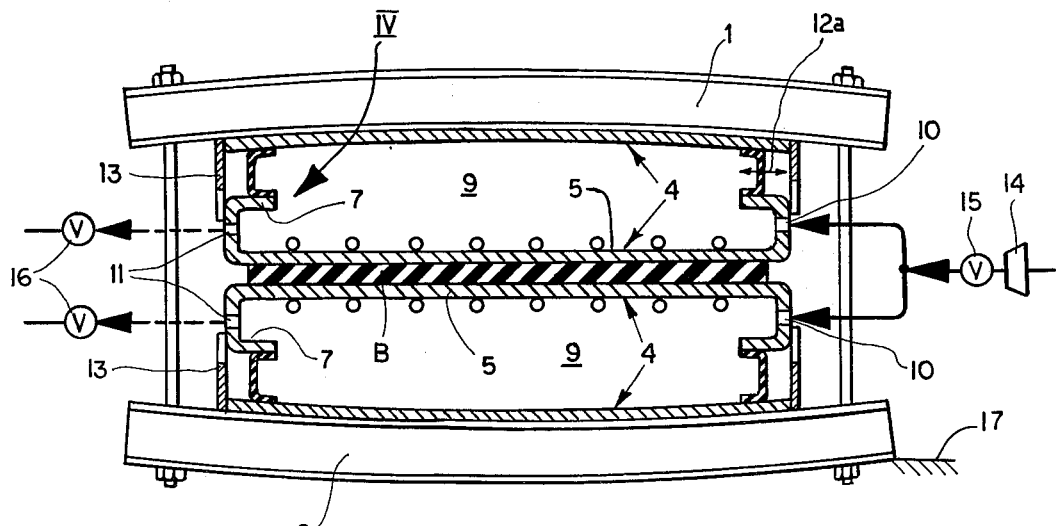

As shown in FIGS. 1 and 2 a belt press according to the instant invention has an upper traverse constituted by a plurality of parallel I-beams 1, and a lower traverse similarly constituted by a plurality of I-beams 2. The lower traverse 2 is mounted on a support 17 and is connected via non-extensible upright links 3 to the upper traverse 1. Each of the traverses 1 and 2 carries a press platen 4.

Each platen 4 is comprised by a traverse plate 6 carried on the respective traverse and a press plate 5 parallel to the respective traverse plate and adapted to compress a workpiece or belt B. The press plate 5 has a rigid reinforcing rim 7, constituted as a turned up and turned in edge of the plate 5, and electrical heating bars 8 are provided on the inner surface of each of these press plates 5.

A U-section elastomeric membrane 12 is provided connecting each one of the rims 7 with the outer periphery of the respective traverse plate 6 so as to form a pressurizable chamber 9. Gas from a compressor 14 can be passed through a valve 15 and introduced into this chamber 9 via holes 10, and the gas can be exhausted from each chamber 9 via holes 11 and through valves 16.

Bolted to each of the traverse plates 6 is a skirt 13 extending away from the respective traverse and snugly surrounding the respective press plate 5. These skirts 13 serve not only to guide the press plate 5 with respect to the traverse plate 6, but also constitute abutments for confining the U-section membranes 12.

Figure 3:
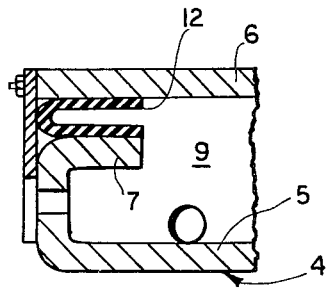
FIGS. 3 and 4 are views of the details shown by arrows III and IV, respectively, of FIGS. 1 and 2.
Figure 4:
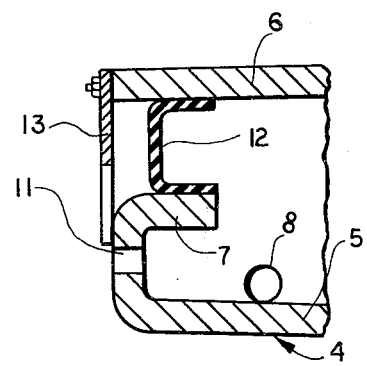

As shown in FIGS. 3 and 4, the membranes 12 flatten out when the press is open, and in this flattened-out condition contact the skirt 13.

FIG. 2 shows how the traverses 1 and 2 bow outwardly when the chambers 9 are pressurized. Since the membranes 12, which move in the direction indicated by double-headed arrow 12a freely, are elastomeric or formed of an accordion-pleated thin steel sheet, this bowing of the traverses 1 and 2, as well as of their respective traverse plates 6, is not transmitted to the press plates 5.

I claim:

1. A belt press comprising:
   vertically spaced upper and lower traverses;
   upright links extending between said traverses and immovably positioning same relative to each other;
   respective upper and lower traverse plates on said traverses having respective lower and upper imperforate surfaces having outer peripheries;
   respective upper and lower press plates adjacent and generally parallel to said traverse plates and having respective lower and upper imperforate surfaces having outer peripheries;
   respective upper and lower guide skirts on said traverse plates and surrounding the respective press plates, each of said press plates being vertically guided in the respective skirt;
   respective rigid upper and lower reinforcing rims on said upper and lower press plates at the respective outer peripheries thereof, each of said rims extending from the respective press plate toward the respective traverse plate;
   respective upper and lower annular membranes each having one end secured to the respective rim and another end secured to the periphery of the respective traverse plate, each membrane forming with the respective upper and lower surfaces a pressurizable chamber;
   means including respective upper and lower heaters in said chambers for heating the respective press plates; and
   means including ports in said press plates for pressurizing said chambers to compress a belt between said press plates with concomitant deformation of said traverses and of said traverse plates.

2. The press defined in claim 1 wherein said membranes are of metal.

3. The press defined in claim 1 wherein each of said membranes is elastomeric.

4. The press defined in claim 1 wherein each of said upper and lower traverses includes a plurality of respective upper and lower traverse beams connected to the respective traverse plates.

5. The press defined in claim 1 wherein said membranes are engageable with and confined by said skirts when said chambers are depressurized.

6. The press defined in claim 1 wherein said membranes are of generally U-section and have inwardly directed flanges constituting said ends and connected to said rims and traverse plates.

7. The press defined in claim 1 wherein each of said press plates is displaceable relative to the respective traverse plate between an advanced position relatively far from the respective traverse plate and a retracted position relatively close to the respective traverse plate, each of said membranes being deformable and bearing horizontally outwardly on the respective skirt in the retracted position of the respective press plate and being horizontally inwardly spaced from the respective skirt in the advanced position of the respective press plate.

* * * * *